United States Patent [19]

Walby et al.

[11] Patent Number: 5,448,308
[45] Date of Patent: Sep. 5, 1995

[54] APPARATUS FOR CLAMPING A VIDEO SIGNAL LEVEL

[75] Inventors: Mark D. Walby, Indianapolis; Nathaniel H. Ersoz, Brownsburg; Eric D. Romesburg; Todd J. Christopher, both of Indianapolis, all of Ind.

[73] Assignee: Thomson Consumer Electronics, Inc., Indianapolis, Ind.

[21] Appl. No.: 14,157

[22] Filed: Feb. 5, 1993

[51] Int. Cl.⁶ ............................................. H04N 5/16
[52] U.S. Cl. ................................. 348/692; 348/697
[58] Field of Search ............... 348/572, 691, 692, 693, 348/694, 695, 696, 697, 472; 358/171, 172, 174, 176; H04N 5/16, 5/18, 11/04, 9/72

[56] References Cited

U.S. PATENT DOCUMENTS

| 4,729,026 | 3/1988 | Suzuki et al. | 348/572 |
| 5,084,700 | 1/1992 | Christopher | 348/572 X |

FOREIGN PATENT DOCUMENTS

| 3817421 | 2/1990 | Germany | H04N 5/18 |
| 0278471 | 11/1988 | Japan | H04N 5/18 |
| 0221990 | 9/1989 | Japan | 358/172 |
| 0226885 | 9/1990 | Japan | 358/171 |
| 0049780 | 2/1992 | Japan | 358/171 |

*Primary Examiner*—James J. Groody
*Assistant Examiner*—David E. Harvey
*Attorney, Agent, or Firm*—Joseph S. Tripoli; Peter M. Emanuel; Robert D. Shedd

[57] ABSTRACT

A video signal clamp involves evaluating the difference between the signal level and the desired clamp level during the back porch interval. A correction signal indicates whether the signal level must be increased or decreased to establish the desired clamp level. Generation of the correction signal involves a median filter algorithm. Any required increase or decrease of the signal level occurs continuously throughout each horizontal line interval.

15 Claims, 4 Drawing Sheets

12 APPARATUS FOR CLAMPING A VIDEO SIGNAL LEVEL

BACKGROUND

Signal processing systems may include a clamping function. For example, a digital video signal processing system may include an analog-to-digital converter (ADC) having an analog input that is AC coupled to an analog video signal source. It is desirable to establish and maintain a DC bias at the input of the ADC so that the analog signal does not exceed the DC range of the ADC. If the DC range is exceeded, signal clipping will occur. Clipping may produce objectionable effects, e.g. image distortion in a video signal processing system. A clamping feature can provide the desired DC bias.

The operation of a signal clamp typically involves sampling the signal level, comparing the sampled value to a reference value, and adjusting the signal level to establish the desired value. As an example, a video signal typically includes "back-porch" intervals during which a DC level is present. In an NTSC compatible signal, the back porch interval begins approximately 4.7 μs after the leading edge of horizontal sync and has a duration of 4.7 μs. In the above-mentioned digital signal processing system, the level at the input of a video ADC during back porch represents the bias at the ADC input. Thus, the ADC input signal level can be sampled during back porch intervals and adjusted to clamp the bias to a desired value.

Certain approaches to clamping may involve completing both the sampling and signal level adjustment operations during a brief interval such as the back porch interval. Attempting to sample and modify a signal level during a relatively brief interval may require a significant signal pulse to adjust the signal level. A pulse may produce transients that introduce noise into the signal processing system. In addition, a signal pulse may interact with sampling causing effects such as oscillations or drift of the clamping level.

SUMMARY OF THE INVENTION

In accordance with the principles of the present invention, signal processing apparatus provides for evaluating during an evaluation interval the relationship between a signal characteristic and a desired signal characteristic. If the results of the evaluation indicate that the relationship is not a desired relationship, the signal characteristic is modified to cause the relationship to substantially become the desired relationship. The modification occurs during a modification interval. The modification interval has a duration exceeding the evaluation interval.

In accordance with another aspect of the present invention, evaluation during the evaluation interval involves a filter exhibiting a median filter algorithm.

DETAILED DESCRIPTION OF THE DRAWING

For purposes of explaining the principles of the present invention, an exemplary embodiment shown in FIG. 1 will be explained in the context of video signal processing systems. As will become readily apparent, the present invention is applicable to a variety of signal processing applications.

Figure 1:
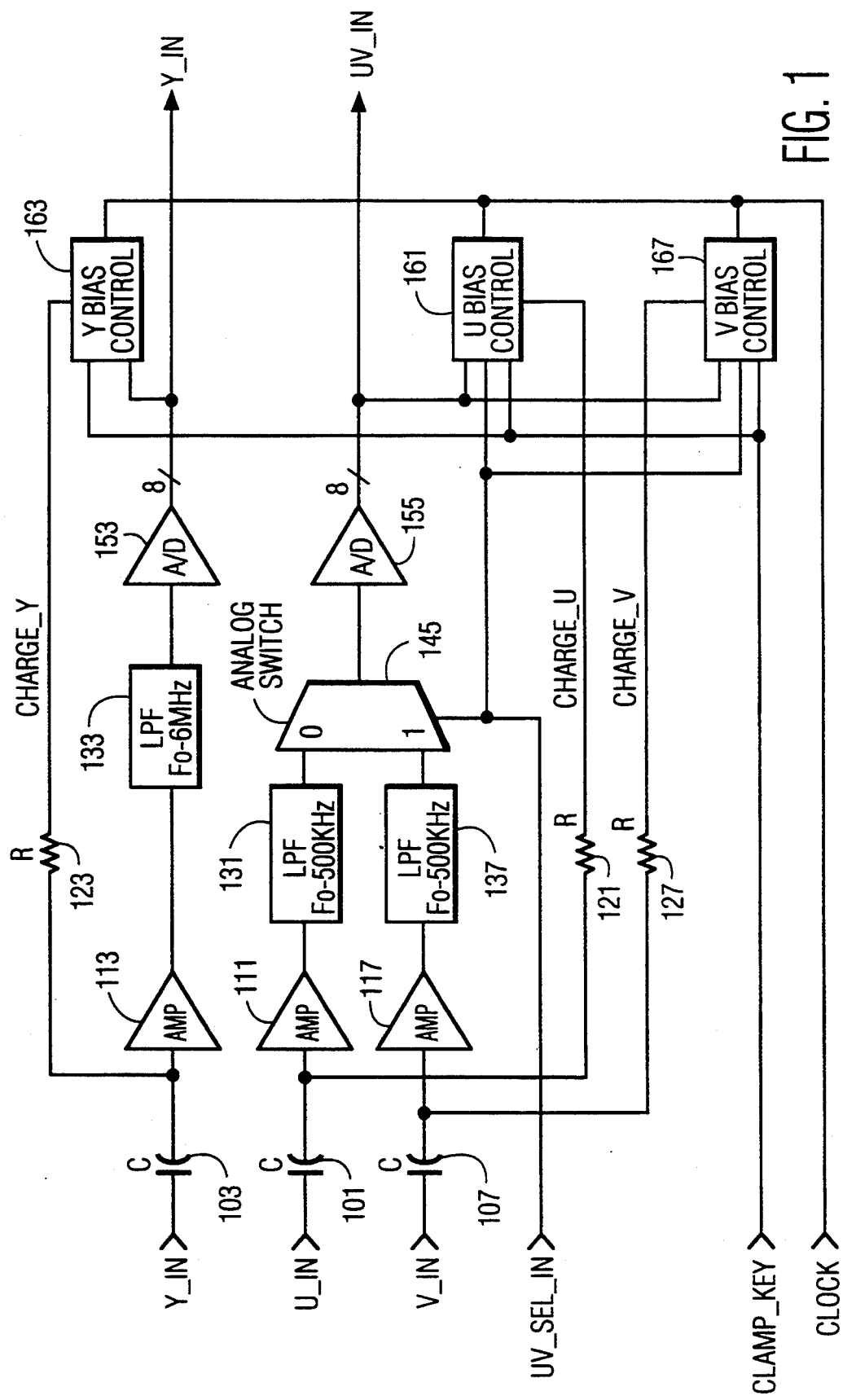
FIG. 1 shows, in block diagram form, an embodiment of a portion of a signal processing system incorporating the principles of the present invention.

In FIG. 1, three channels are shown for processing video input signals Y_IN, U_IN, and V_IN where signal Y_IN represents a luminance signal and signals U_IN and V_IN represent color difference signals (e.g. R-Y and B-Y). Coupling capacitors 103, 101, and 107 couple signals Y_IN, U_IN, and V_IN to respective amplifiers 113, 111, and 117. As is described further below, the input DC bias of each amplifier is clamped in accordance with the principles of the present invention.

Each amplifier output is coupled to a low pass filter (LPF) exhibiting an appropriate frequency response. As an example, FIG. 1 indicates a 6 MHz bandwidth for luminance LPF 133 and a bandwidth of 500 kHz for chrominance LPF's 131 and 137. The output of luminance LPF 133 is coupled to analog-to-digital converter (A/D or ADC) 153 which produces 8-bit digital luminance output signal Y_IN. A single 8-bit digital chrominance output signal, i.e. signal UV_IN, is produced at the output of ADC 155.

The chrominance (i.e. U_IN and V_IN) bandwidth is sufficiently low to permit multiplexing chrominance input signals U_IN and V_IN for purposes of analog to digital conversion of the chrominance information. Thus, only a single ADC, namely ADC 155, is required for chrominance information. The multiplexing operation is performed via analog switch 145 which alternately couples signals U_IN and V_IN to ADC 155. Analog switch 145 is controlled by control signal UV_SEL_IN. Signal UV_SEL_IN may be generated by dividing (not shown in FIG. 1) the frequency of ADC clock signal CLOCK by an integer value, e.g. two.

Bias level clamping at the inputs of amplifiers 113, 111, and 117 is controlled by signals CHARGE_Y, CHARGE_U, and CHARGE_V, respectively. These signals are produced by bias control circuits 163, 161, and 167 in response to a digital clock signal CLOCK, a timing signal CLAMP_KEY, and one of digital output signals Y_IN and UV_IN. Signal Y_IN is coupled to bias control circuit 133 while signal UV_IN is coupled to both bias control circuits 161 and 167 because of the multiplexed nature of the U and V digital chrominance data in output signal UV_IN. Signal UV_SEL_IN is coupled to bias control circuits 161 and 167 to synchronize the operation of U and V bias control to the presence of U and V related data at the output of ADC 155. Signals CHARGE_Y, CHARGE_U, and CHARGE_V are coupled to respective inputs of amplifiers 113, 111, and 117 via resistors 123, 121, and 127, respectively.

Figure 2:
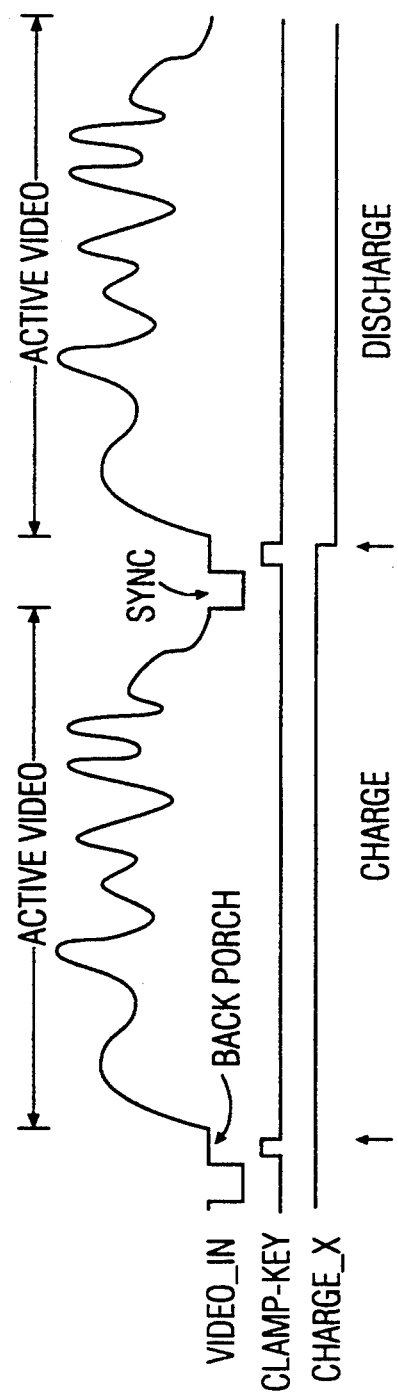
FIG. 2 shows signal waveforms useful for understanding the operation of the embodiment in FIGS. 1, 3, and 4.

To briefly summarize the operation of the bias control circuits, each bias control circuit monitors the voltage at the input of the corresponding amplifier during a portion of the back porch interval. If the bias level is not a desired level, the bias voltage is increased (the input coupling capacitor is charged) or decreased (the input coupling capacitor is discharged). The decision to charge or discharge a particular capacitor is updated during a portion of each back porch interval as defined by a pulse on signal CLAMP_KEY. The timing relationship between the analog video signal and signal CLAMP_KEY is shown in FIG. 2. Charging, or discharging, continues throughout each horizontal interval as shown by signal CHARGE_x in FIG. 2. Signal CHARGE_x represents one of signals CHARGE_Y, CHARGE_U, or CHARGE_V in FIG. 1.

Signal CLAMP_KEY may be generated (not shown in the drawings) by, for example, counting cycles of a digital clock signal, such as signal CLOCK in FIG. 1, at frequency $f_C$. Frequency $f_C$ may be 1024 times the horizontal frequency $f_H$ where frequency $f_H$ for NTSC systems is approximately 15.6 kHz. As mentioned above, the back porch interval begins approximately 4.7 μs after the leading edge of horizontal sync (i.e. falling edge of SYNC pulse in FIG. 2) and continues for 4.7 μs. Based on a frequency $f_C$ of 1024 $f_H$, a pulse on signal CLAMP_KEY that begins 96 cycles of signal CLOCK (approximately 6 μs) after the leading edge of sync and continues for 32 cycles (approximately 2 μs) will be within the back porch interval as desired.

Figure 3:
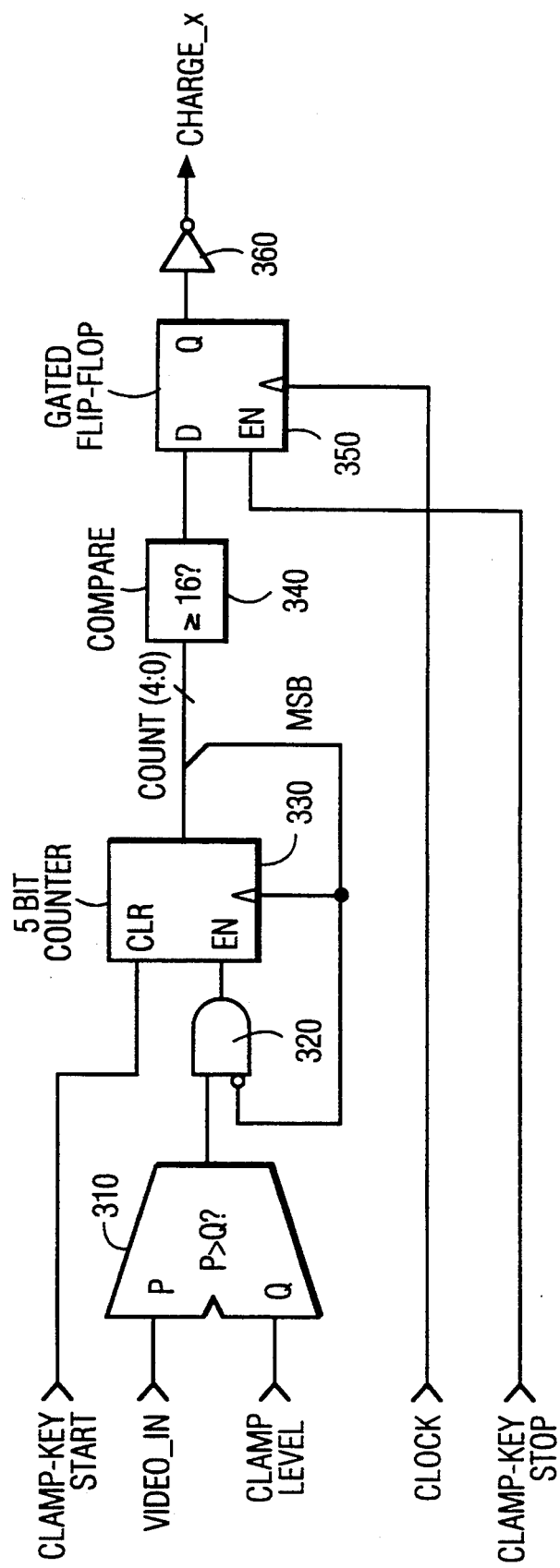
FIG. 3 shows a schematic diagram representation of a digital logic implementation of a feature shown in block diagram form in FIG. 1.

The operation of bias control circuits 163, 161, and 167 may be better understood by referring to FIG. 3. The following description of FIG. 3 will refer only to bias control circuit 163 and the luminance channel of FIG. 1. However, the three bias control circuits operate in a similar manner.

During the interval defined by each pulse on signal CLAMP_KEY, bias control circuit 163 compares the DC level at the input of amplifier 113 to a desired reference level. In FIG. 3, the comparison is performed digitally by comparator 310. Signal CLAMP LEVEL coupled to the Q input of comparator 310 is a digital representation of the reference level, i.e. the desired clamp level. Signal VIDEO_IN coupled to the P input of comparator 310 represents the digital signal at an ADC output. For bias control circuit 163, signal VIDEO_IN represents digital signal Y_IN at the output of ADC 153. If comparator 310 is a typical digital comparator requiring unsigned binary inputs (i.e. a range of 0 to +2n) and ADC output is in 2's complement format (i.e. a range of −n to +n), an inversion (not shown in FIG. 3) of the most significant bit (MSB) of signal VIDEO_IN is required.

Figure 4:
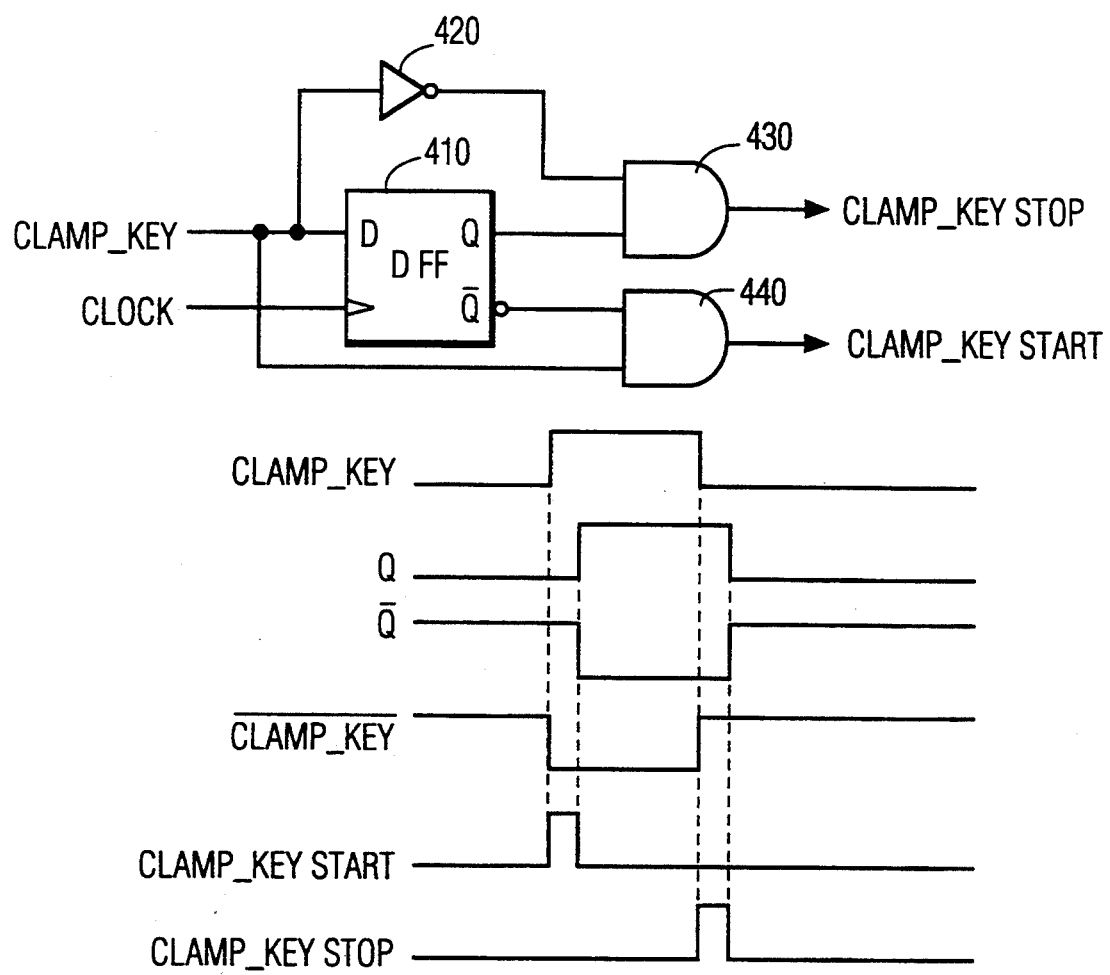
FIG. 4 shows an embodiment of an approach to generating control signals shown in FIG. 3.

As indicated in FIG. 3, comparator 310 determines if the value at input P is greater than the value at input Q. Thus, if signal VIDEO_IN is greater than reference level CLAMP LEVEL, the output of the comparator is true (e.g. at logic 1) enabling 5-bit counter 330 via AND gate 320. Signal CLAMP_KEY START resets counter 330 to a count of zero at the beginning of the interval defined by signal CLAMP_KEY. Signal CLAMP_KEY START provides a pulse indicating the start of the CLAMP_KEY pulse interval. Signal CLAMP_KEY START may be generated as shown in FIG. 4.

When enabled, counter 330 is clocked by signal CLOCK and, therefore, counts cycles of signal CLOCK. Thus, the output of counter 330 indicates the number of cycles of signal CLOCK following the beginning of the CLAMP_KEY pulse during which signal VIDEO_IN exceeds reference level CLAMP LEVEL. If the output of counter 330 reaches a count of 16 as indicated by the MSB of the counter output, counting is disabled via AND gate 320. The count value at the output of counter 330 is evaluated by comparator 340 which produces a true (e.g. logic 1) output when the count value is equal to or exceeds 16. At the end of the clamp key interval as indicated by signal CLAMP_KEY STOP, the comparator output (or the MSB of the count value) is latched into D-type flip-flop (DFF) 350. An approach to generating signal CLAMP_KEY STOP is shown in FIG. 4.

A logic 1 at the output of DFF 350 indicates that signal VIDEO_IN has exceeded the reference level for at least half of the CLAMP_KEY pulse (i.e. 16 out of 32 cycles of signal CLOCK during the CLAMP_KEY pulse). In response to a logic 1 at the output of DFF 350, signal CHARGE_x at the output of inverter 360 goes to logic 0 discharging the corresponding coupling capacitor in FIG. 1, thereby decreasing the bias level. Similarly, a logic 0 at the output of DFF 350 indicates that signal VIDEO_IN is not greater than the reference level for at least one-half of the CLAMP_KEY pulse interval. A logic 0 at the output of DFF 350 causes signal CHARGE_x to go to logic 1 charging the corresponding coupling capacitor in FIG. 1, thereby increasing the bias level.

The effect of deciding whether to charge or discharge based on a count of at least 16 out of 32 is to filter the voltage at the clamping point during the sampling procedure using a median filter algorithm. A median filter algorithm advantageously decreases the likelihood that "shot" type noise in the video signal will affect the charge-discharge decision. In addition, as FIG. 3 demonstrates, a median filter algorithm may be implemented with relatively few devices.

Another aspect of the embodiment shown in FIG. 3 is that charging, or discharging, may continue throughout each horizontal line interval as shown in FIG. 2. The charge-discharge decision is updated only at the end of the CLAMP_KEY pulse interval when DFF 350 is clocked by signal CLAMP_KEY STOP. Thus, a particular charge-discharge decision remains in effect for a complete horizontal line interval. In addition, the output of inverter 360 is connected to signal CHARGE_x continuously. As result, charge or discharge occurs continuously at a rate determined by the output impedance of inverter 360, the value R of resistor 123 (for the luminance channel), and the voltage on the coupling capacitor. Continuous charge or discharge advantageously eliminates the need for charge or discharge pulses that might introduce noise. Also, there is no need to decouple signal CHARGE_x from the charge-discharge source. Therefore, a simple inverter may be used for device 360 rather than a more complex tristate device.

The preceding description and the embodiment shown in FIG. 3 are applicable to each of bias control functions 163, 161, and 167 shown in FIG. 1. However, less complex implementations of the functions in FIG. 3 are also possible. For example, comparator 340 may be eliminated when the charge-discharge decision is based on the output of counter 330 reaching a number that is an integer power of two, e.g. 16 as described above. In FIG. 3, the MSB of the output of counter 330 indicates when the count value is at least 16. Thus, the MSB of the counter output indicates the charge-discharge decision point and may be coupled directly to DFF 350 eliminating comparator 340.

System design considerations may make it possible to further simplify the arrangement shown in FIG. 3. For example, it may be desirable to clamp the bias level for the color difference channels, i.e. signals U_IN and V_IN, to the midpoint of the signal range. If ADC 155 produces a 2's complement output, the midrange value is 0. The MSB of the output of ADC 155 indicates whether the signal level is below midrange or at least equal to midrange. If the MSB value is logic 1, the signal level is less than midrange. If the MSB value is logic 0, the signal level is 0 or positive indicating that the signal level is at least midrange. Thus, comparator 310 in FIG. 3 is not necessary because the MSB value indicates the relationship of signal level to the desired midrange level. The MSB of the output of ADC 155 may be inverted and coupled to an input of AND gate 320 to enable counter 330. If the output of ADC 155 is unsigned binary, the MSB of the ADC output provides a signal midrange indicator that can be directly coupled to AND gate 320 (i.e. no inversion) to enable counter 330.

Various other modifications of the embodiment shown in the Figures and described above are possible. For example, the width of the CLAMP_KEY pulse may vary. If a different clock frequency is selected, 32 clock cycles would produce a different pulse width than that described above. Alternatively, it may be desirable to increase the number of clock cycles during the CLAMP_KEY pulse to increase the number of "samples" of the video signal level that may be counted during the CLAMP_KEY interval. An increased number of samples may enhance the performance of the median filtering algorithm. In addition, a count other than 16 may be used to determine whether charging or discharging will occur. For example, if the number of pulses during the CLAMP_KEY pulse is changed, the count limit might be changed to maintain the above-described relationship of one-half between the count limit and the total number of clock cycles during the CLAMP_KEY pulse. Also, the count limit could be modified to vary the relationship between the count limit and the total number of clock pulses, thereby modifying the filter algorithm.

Another possible modification involves resistors 121-127 and capacitors 101-107 shown in FIG. 1. If the source of signal CHARGE_x in FIG. 3 is current driven rather than voltage driven as in FIG. 3, resistors 121-127 are not required. As indicated in FIG. 1, resistors 121-127 may be of equal value, e.g. 160 kΩ each. Similarly, capacitors 101-103 may be of equal value such as 10 μF each. System requirements may, however, require one or more resistance, or capacitance, values to differ.

In addition to the preceding modifications, the present invention may be useful in systems other than video signal processing systems. In particular, the invention is not limited to applications involving three channels, each including a bias control function as shown in FIG. 1. The described embodiment is well-suited for implementation in a signal processing integrated circuit, thereby further expanding the potential uses of the invention.

As discussed above, using an approach other than the described continuous charge, or discharge, approach may add complexity, e.g. a tristate device, may be necessary in FIG. 3. However, if adding a tristate device is not objectionable in a particular application, the charge and discharge timing may be modified such that charging or discharging occurs during a particular portion of a horizontal line interval rather than a complete line interval. For example, it may be desirable that charging or discharging occurs during an interval that extends into the active video interval but is less than a complete line interval.

We claim:

1. Apparatus for clamping a signal level of a video signal including a reference level during a first interval within a horizontal line interval and including video image information during a second interval within said horizontal line interval, said second interval being exclusive of said first interval, said apparatus comprising:
    means for providing a timing signal indicating said first interval;
    a capacitor having first and second terminals for AC coupling said video signal from said first terminal to said second terminal;
    means responsive to a control signal for modifying a DC level at said second terminal of said capacitor; and
    control means coupled to said second terminal and responsive to said timing signal for evaluating said DC level during said first interval and for generating said control signal for modifying said DC level during a portion of said second interval to establish a predetermined relationship between said DC level and said reference level;
    said DC level being modified during said portion of said second interval at a rate determined by an impedance of said DC level modifying means and a capacitance value of said capacitor.

2. The apparatus of claim 1 wherein said control means comprises:
    means for generating a second control signal representative of a relationship between said DC level and said reference level; and
    means for filtering said second control signal including:
        a counter responsive to said second control signal and to said timing signal for generating a count during said first interval, said count indicating a fraction of said first interval during which said DC level and said reference level exhibit said predetermined relationship; and
        means for evaluating said count.

3. The apparatus of claim 2 wherein
    said means for generating said second control signal comprises a first comparator for comparing said DC level to said reference level;
    said count evaluating means comprises a second comparator for comparing said count to a predetermined count representative of a predetermined fraction of said first interval;
    said means for modifying said DC level comprises an amplifier having an input coupled to said second comparator and an output coupled via a signal path to said second terminal of said capacitor;
    said output of said amplifier and said signal path exhibit said impedance for modifying a charge stored on said capacitor at said rate; and
    said charge being modified during said portion of said second interval when said DC level exhibits said predetermined relationship to said reference level for a fraction of said first interval less than said predetermined fraction.

4. The apparatus of claim 3 wherein said predetermined fraction substantially equals one-half for providing a median filter characteristic for said filter means.

5. The apparatus of claim 4 wherein said portion of said second interval comprises substantially all of said second interval.

6. Apparatus for clamping a signal level of a video signal including a reference level during a first interval within a horizontal line interval and including video image information during a second interval within said horizontal line interval, said second interval being exclusive of said first interval, said apparatus comprising:

means for providing a timing signal indicating said first interval;

a capacitor having first and second terminals for AC coupling said video signal from said first terminal to said second terminal;

means responsive to a control signal for modifying a DC level at said second terminal of said capacitor;

an analog-to-digital converter coupled to said second terminal of said capacitor for converting said AC coupled video signal to a plurality of binary bits having respective values representative of respective levels of said video signal; and control means responsive to said timing signal and to a predetermined one of said plurality of binary bits for evaluating said DC level during said first interval and for generating said control signal for modifying said DC level during a portion of said second interval to establish a predetermined relationship between said DC level and said reference level;

said DC level being modified during said portion of said second interval at a rate determined by an impedance of said DC level modifying means and a capacitance value of said capacitor.

7. The apparatus of claim 6 wherein said control means comprises means for filtering said predetermined binary bit including:

a counter responsive to said predetermined binary bit and to said timing signal for generating a count during said first interval, said count indicating a fraction of said first interval during which said DC level and said reference level exhibit said predetermined relationship; and a comparator for comparing said count to a predetermined count representative of a predetermined fraction of said first interval.

8. The apparatus of claim 7 wherein said means for modifying said DC level comprises an amplifier having an input coupled to said comparator and an output coupled via a signal path to said second terminal of said capacitor;

said output of said amplifier and said signal path exhibit said impedance for modifying a charge stored on said capacitor at said rate; and said charge being modified during said portion of said second interval when said DC level exhibits said predetermined relationship to said reference level for a fraction of said first interval less than said predetermined fraction.

9. The apparatus of claim 8 wherein said predetermined fraction substantially equals one-half for providing a median filter characteristic for said filter means.

10. The apparatus of claim 9 wherein said portion of said second interval comprises substantially all of said second interval.

11. Apparatus for clamping a signal level of a video signal including a reference level during a first interval within a horizontal line interval and including video image information during a second interval within said horizontal line interval, said second interval being exclusive of said first interval, said apparatus comprising:

means for providing a timing signal indicating said first interval;

a capacitor having first and second terminals for AC coupling said video signal from said first terminal to said second terminal;

means responsive to a first control signal for modifying a DC level at said second terminal of said capacitor;

a comparator for comparing said DC level to said reference level for producing a second control signal indicating when said DC level exhibits a predetermined relationship to said reference level;

control means responsive to said timing signal for evaluating said second control signal during said first interval and for generating said first control signal for modifying said DC level during a portion of said second interval to establish said predetermined relationship between said DC level and said reference level;

said DC level being modified during said portion of said second interval at a rate determined by an impedance of said DC level modifying means and a capacitance value of said capacitor.

12. The apparatus of claim 11 wherein said control means comprises means for filtering said second control signal including a counter responsive to said second control signal and to said timing signal for generating a count during said first interval; said count indicating a fraction of said first interval during which said DC level and said reference level exhibit said predetermined relationship, and said count comprising a plurality of binary bits including a predetermined binary bit for indicating when said fraction of said first interval equals a predetermined fraction of said first interval.

13. The apparatus of claim 12 wherein said means for modifying said DC level comprises an amplifier having an input coupled to said predetermined binary bit and an output coupled via a signal path to said second terminal of said capacitor;

said output of said amplifier and said signal path exhibit said impedance for modifying a charge stored on said capacitor at said rate; and said charge being modified during said portion of said second interval when said DC level exhibits said predetermined relationship to said reference level for a fraction of said first interval less than said predetermined fraction.

14. The apparatus of claim 13 wherein said predetermined fraction substantially equals one-half for providing a median filter characteristic for said filter means.

15. The apparatus of claim 14 wherein said portion of said second interval comprises substantially all of said second interval.

* * * * *